United States Patent [19]

Stewart

[11] 4,127,746
[45] Nov. 28, 1978

[54] METHOD AND APPARATUS EMPLOYING A PULSED CARRIER IN GENERATING SINGLE SIDEBAND SIGNALS FOR FDM TRANSMISSION

[75] Inventor: James A. Stewart, Menlo Park, Calif.

[73] Assignee: GTE Automatic Electric Laboratories, Incorporated, Northlake, Ill.

[21] Appl. No.: 817,897

[22] Filed: Jul. 21, 1977

[51] Int. Cl.² .............................................. H04J 1/06
[52] U.S. Cl. ............................................... 179/15 FS
[58] Field of Search ......... 179/15 FS, 15 FD, 15 BP, 179/15 AA, 2.5 R

[56] References Cited

U.S. PATENT DOCUMENTS 3,859,469  1/1975  Getgen ............................ 179/15 FD

OTHER PUBLICATIONS

GTE Lenkurt Demodulator, Sept. 1973, "FDM Modulation Plans and Polylithic Crystal Filters", pp. 6–7.

Primary Examiner—Kathleen H. Claffy
Assistant Examiner—Joseph A. Popek
Attorney, Agent, or Firm—Russell A. Cannon

[57] ABSTRACT

In the transmit circuits of one terminal, a high frequency (HF) sinusoidal carrier signal of frequency $f_c$ is combined with a low frequency (LF) pulse signal having a PRF $f_p$ to produce a pulsed carrier signal having a plurality of component frequencies $af_c \pm bf_p$. The pulsed carrier is modulated in each voice channel by an associated voice signal to produce sidebands of the HF component frequencies there. A different sideband is selected at HF for each channel by polylithic crystal bandpass filter. The selected HF sidebands are then combined with the carrier signal to translate them to low frequencies for subsequent transmission.

23 Claims, 10 Drawing Figures

EAST TERMINAL

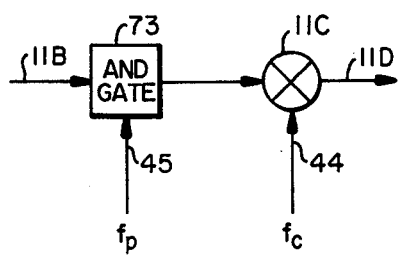
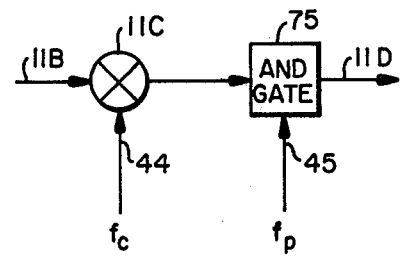
Fig. 9.    Fig. 10.
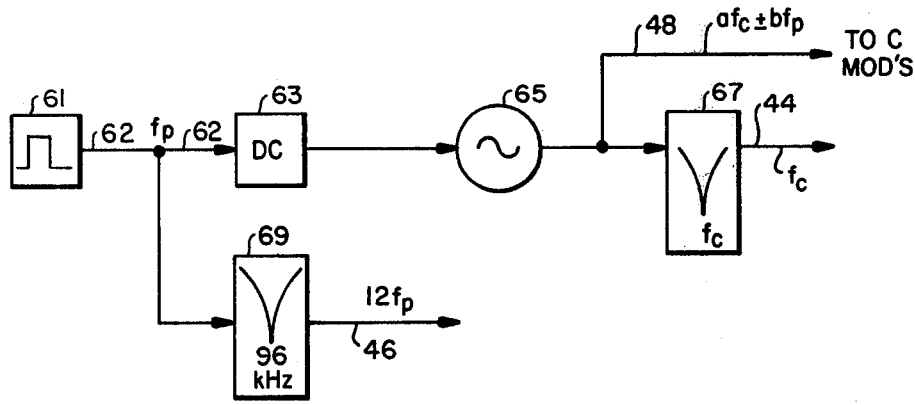
Fig. 7.
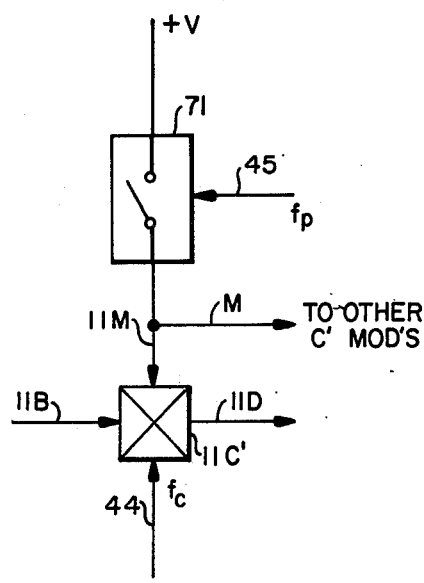
Fig. 8.
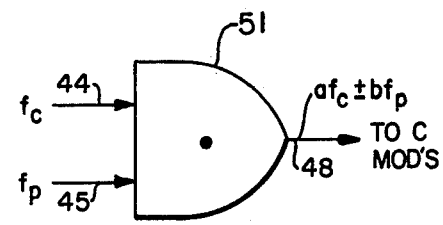
Fig. 3.

METHOD AND APPARATUS EMPLOYING A PULSED CARRIER IN GENERATING SINGLE SIDEBAND SIGNALS FOR FDM TRANSMISSION

BACKGROUND OF INVENTION

This invention relates to frequency division multiplex (FDM) systems and, more particularly, to improved method and apparatus for generating modulated line signals.

Frequency division multiplexing is the process of simultaneously transmitting a plurality of voice telephone conversations over a pair of wires, each of the voice signals being shifted to a higher preassigned unique position in the frequency spectrum for subsequent transmission. In one prior art FDM system, the input signal in each voice channel is combined in an associated first modulator with the same high frequency (HF) carrier signal having a frequency $f_c$ to produce a modulated signal comprising upper and lower sidebands of $f_c$. The upper sideband is selected in each channel by an associated polylithic crystal bandpass filter, all of which have the same passband. The carrier signal is also applied to a gate which is pulsed at a rate $f_p = 4$ kHz to produce components having frequencies $af_c \pm bf_p$, where $a$ and $b$ are integers. In each channel, a different one of these frequency components is selected by a notch filter and combined in a second modulator with the selected sideband to translate the latter to a prescribed-unique position in the frequency spectrum for subsequent transmission. It is relatively expensive to provide a high frequency notch filter having a different pick-off frequency in each channel. Another prior art FDM system, which is similar to the above, uses separate oscillators operating at slightly different frequencies in each channel in place of the notch filter, gate, and pulse signal source. In order to prevent drift and subsequent impairment of recovered voice signals, rigid stability requirements are placed on the carrier oscillators which makes them relatively expensive. In yet another prior art FDM system, an HF carrier signal of frequency $f_c$ is pulsed at a low frequency rate $f_p$ to produce carrier signal components having frequencies $af_c \pm bf_p$. A notch filter in each channel picks off a different carrier component which is combined in an associated first modulator with the voice signal to produce sidebands of only that carrier component frequency. Polylithic crystal filters having different passbands select the upper sideband in each channel. A different carrier component is picked off by another notch filter and combined with each selected sideband in associated second modulators to translate the latter to prescribed unique positions in the frequency spectrum for subsequent transmission. Notch filters having different pick-off frequencies here add additional expense to this system.

The U.S. Pat. No. 3,518,376, issued June 30, 1970, entitled Low Frequency Television System by Ira Kamen et al, describes a communication system in which a different low frequency carrier signal is combined in each channel with the input signal there to produce sidebands of only the associated carrier frequency, one of the sidebands being selected at low frequencies by a bandpass filter for subsequent transmission. Low frequency bandpass filters are generally more expensive than high frequency polylithic crystal bandpass filters having the same bandwidths. The article, A Method For Frequency-Division Multiplexing and Its Integration With Time-Division Switching by P. M. Thrasher, IBM Journal, March 1965, pgs. 137–140, discloses a resonant transfer multiplex system. In this system, connecting each input voice signal to an associated bandpass filter at a prescribed low frequency sampling rate of $f_p = 8$ kHz produces at the input to the filter sidebands of frequencies which are multiples of $f_p$. Each bandpass filter selects a different-particular sideband. Since the switching occurs at low frequency, the filtering must also be accomplished at low frequencies. Bandpass filters having low frequency passbands are relatively expensive and complex when compared to high frequency polylithic crystal bandpass filters. Another resonant transfer multiplex system, which accomplishes bandpass filtering in each channel at low frequencies, is described in U.S. Pat. No. 3,859,469, issued Jan. 7, 1975, entitled Combination Hybrid Frequency Division Multiplexing Circuit by L. E. Getgen.

An object of this invention is the provision of improved FDM method and apparatus for producing sidebands of a plurality of harmonically related frequencies in each channel for selecting a different sideband in each channel for subsequent transmission.

SUMMARY OF INVENTION

In a frequency division multiplex system embodying this invention, apparatus for translating a message signal in one frequency band having a bandwidth W to another frequency band for subsequent transmission, comprises: first means for producing a pulse signal having a pulse repetition frequency $f_p$ and comprised of a plurality of sinusoidal harmonic component signals having frequencies $bf_p$, where $b$ is an integer, and for producing at least a first carrier signal having a frequency $f_{c1}$; second means for combining the message signal, the pulse signal and the first carrier signal so as to cause the message signal to be in both lower and upper sidebands of the plurality of carrier frequencies $af_{c1} \pm bf_p$, where $a$ is also an integer; and third means for selecting at least one sideband of the lower and upper sidebands of a particular one of the frequencies $af_{c1} \pm bf_p$ containing the message signal.

DESCRIPTION OF DRAWINGS

This invention will be more fully understood from the following description of preferred embodiments thereof in relation to drawings in which similar elements in the various figures are identified by the same reference numerals and letters and by primed reference symbols, and where:

FIG. 3 is a circuit diagram illustrating one embodiment of the combining circuit 47 in FIG. 1;

FIG. 7 is a schematic block diagram of alternate structure of the signal source 43 and combining circuit 47; and FIGS. 8–10 are schematic block diagrams of alternate structures for operating on the carrier, pulse, and bandlimited voice signals for producing the desired plurality of modulated component signals on the D lines.

DESCRIPTION OF PREFERRED EMBODIMENTS

Figure 5:
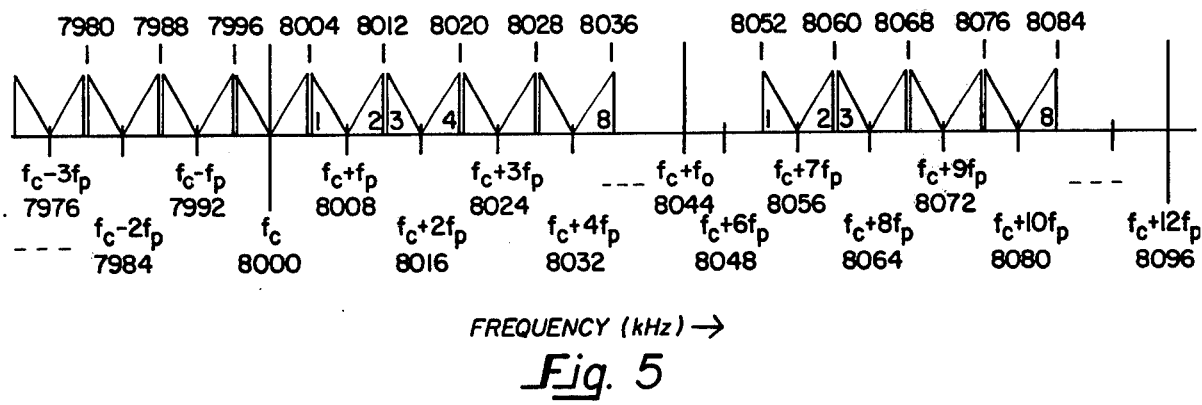
FIGS. 5 and 6 are representations of modulated waves on the D lines and line 11K, respectively, in FIG. 1 which illustrate the modulation plan of this invention and are useful in explaining the operation of the terminals in FIGS. 1 and 2.
Figure 6:
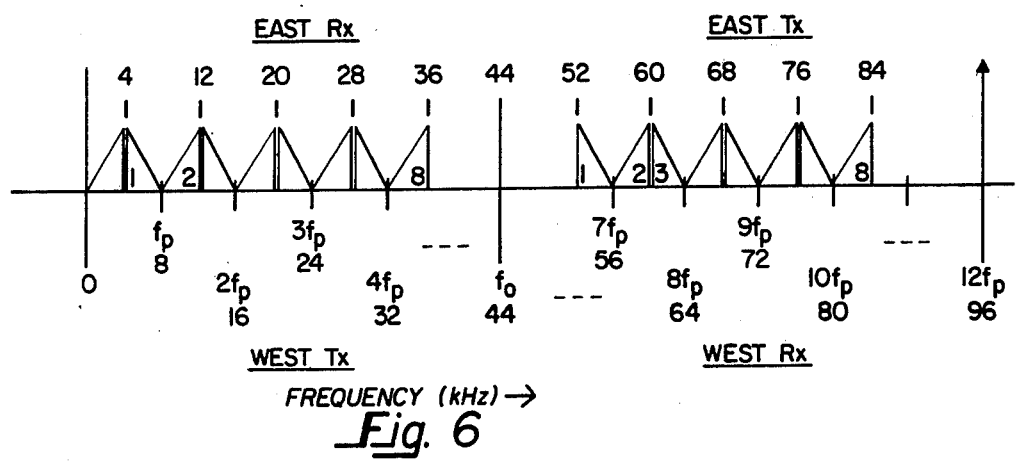

In accordance with one embodiment of this invention, the modulation plan is to shift the input voice signals to separate-preselected positions in the low frequency range as is shown in FIG. 6 for subsequent transmission by: (1) combining a pulse signal having a low frequency PRF $f_p$ and an HF carrier signal of frequency $f_c$ to produce a pulsed carrier signal comprising sinusoidal components having frequencies $af_c \pm bf_p$, where $a$ and $b$ are integers (see FIG. 4); (2) combining each voice signal individually with the pulsed carrier signal to produce in each associated channel circuit sidebands of the HF component frequencies $af_c \pm bf_p$ (see FIG. 5); (3) selecting a particular-different sideband associated with each channel circuit; and (4) combining the selected HF sidebands with the HF carrier signal to arrange them at preselected unique positions in the low frequency portion of the frequency spectrum which are a function of $f_p$ and independent of $f_c$ (see FIG. 6).

Figure 1:
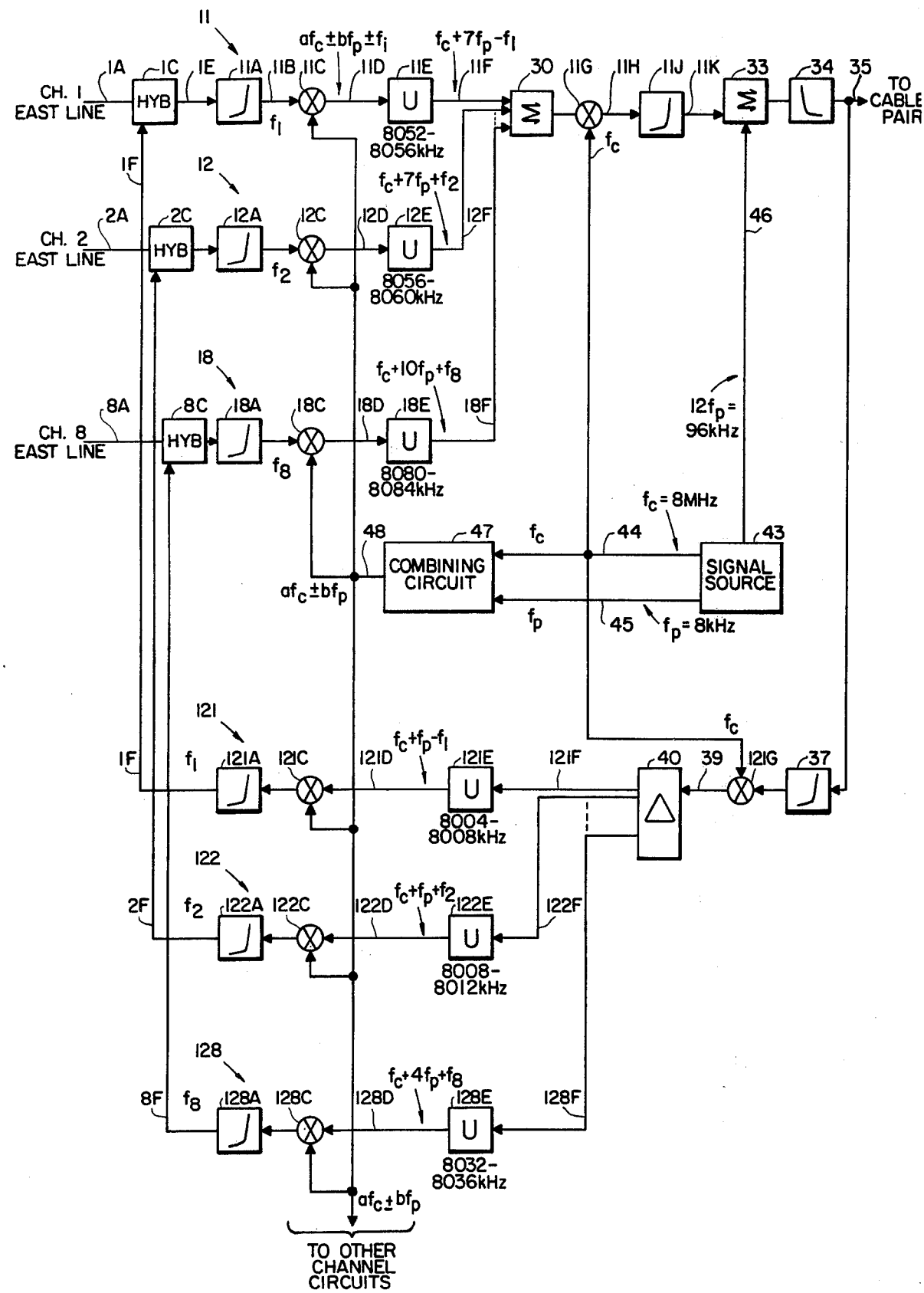
FIGS. 1 and 2 are schematic block diagrams of portions of east and west terminals of an FDM system embodying this invention.
Figure 2:
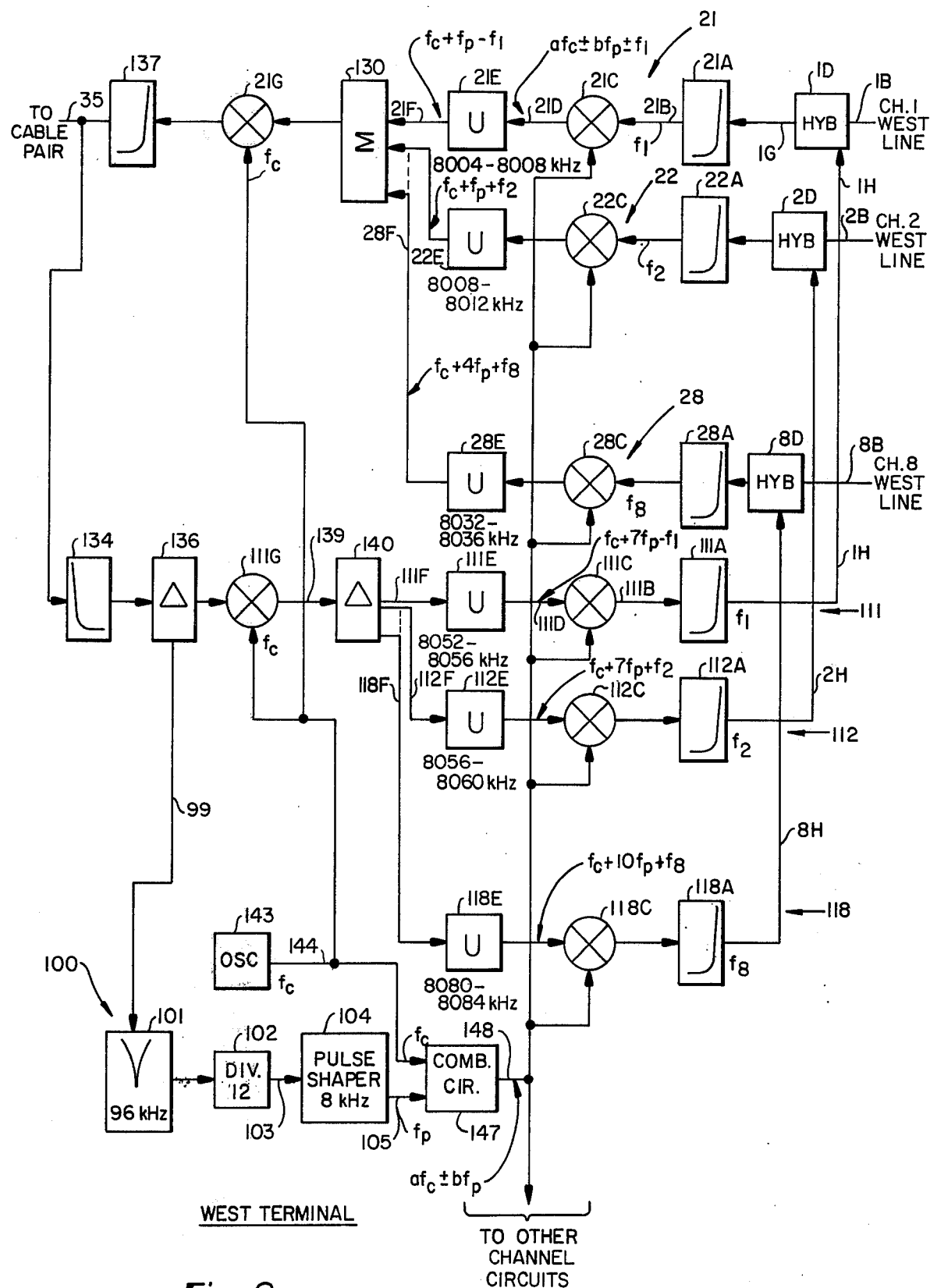

An FDM system embodying this invention is generally illustrated in FIGS. 1 and 2 which show the east and west terminals thereof. Each of these terminals includes equipment for a plurality of say eight voice channels on associated pairs of channel lines such as 1A and 1B. Conventional circuits for providing functions such as amplification, power, dial pulse supervision, ringing and synchronization are omitted from the drawings for simplicity of illustration. Each voice channel typically has a 4 kHz bandwidth to accommodate frequencies in the range of approximately 300 to 3400 Hz in an associated voice signal. The upper frequency $f_u$ of each voice channel is therefore designated as $f_u = 4$ kHz for convenience.

Each of the channel lines is connected to an associated east and west voice frequency (VF) hybrid designated by the same numeral and the letters C and D, respectively. By way of example, the lines 1A and 1B are connected to the associated hybrids 1C and 1D in channel 1. The channels 1, 2 and 8 also have east transmit circuits 11, 12 and 18 in FIG. 1 which operate in conjunction with west receive circuits 111, 112 and 118, respectively, in FIG. 2 to provide communication paths in one direction. These east transmit and west receive circuits produce signals on and receive signals from line 35 having frequencies greater than the frequency $f_o$ in FIG. 6. The channels 1, 2 and 8 also have west transmit circuits 21, 22 and 28 in FIG. 2 which operate in conjunction with associated east receive circuits 121, 122 and 128 in FIG. 1 to provide communication paths in the opposite direction. These west transmit and east receive circuits produce on and receive from the line 35 signals having frequencies which are less than the frequency $f_o$ in FIG. 6. All of the east and west transmit circuits in FIGS. 1 and 2 are substantially the same, except that they select sidebands at different frequencies. Similarly, all of the east and west receive circuits are substantially the same. Each receive circuit is also similar to the associated transmit circuit, except that elements of the former generally appear in the reverse order there. Since all of the transmit and receive circuits are similar, the structure and operation of primarily only the east transmit circuit 11 and the east receive circuit 121 will be described in detail hereinafter.

The transmit circuit 11 in FIG. 1 comprises lowpass filter 11A, first modulator circuit 11C, and bandpass filter 11E connected in series between the output line 1E of the associated hybrid and the line 11F. The output lines 11F-18F of the east transmit circuit bandpass filters are all applied to a combining circuit 30, which is connected through the series combination of a second modulator circuit 11G, a second lowpass filter 11J, a second combining circuit 33 and a directional highpass filter 34 to the cable pair for transmission to the west terminal in FIG. 2. In the preferred embodiment of this invention, only the channel circuit 11 includes a second modulator circuit 11G and an output lowpass filter 11J, since the signals in all of the other transmit channels are passed through these elements. Alternatively, the combining circuit 30 may be omitted and an associated second modulator and lowpass filter connected to the output of each of the E bandpass filters here, the outputs of the several lowpass filters J then being connected to the combining circuit 33. The east receive circuit 121 comprises the series combination of a lowpass filter 121A, first modulator circuit 121C, and bandpass filter 121E connected in series between the input line 1F to the associated hybrid 1C and the line 121F. The line 35 is connected through the series combination of a second directional filter 37, a second modulator circuit 121G and a distribution circuit 40 to the input lines 121F-128F of the east receive circuit bandpass filters. Although only receive channel circuit 121 is shown with a second modulator circuit 121G, the distribution circuit 40 may be directly connected to the output of filter 37 and an associated G modulator located in each of the lines 121F-128G.

All of the input and output A lowpass filters have the same cutoff frequency of approximately 3400 Hz to set the passband of the voice channels to be 0-4 kHz, with a guard band. All of the C and G modulators are the same devices and, preferably, comprise balanced modulators. Alternatively, they may be shunt switched modulators or product modulators. Polylithic crystal filters are devices which operate at high frequencies and generally comprise coupled resonators which are formed on crystal wafers. All of the E bandpass filters here are preferably high frequency polylithic bandpass filters, such as are described in U.S. Pat. No. 3,723,920, issued Mar. 27, 1973 to Desmond F. Sheahan and George C. Callander for Crystal Filter Assembly. Each of the E transmit and receive bandpass filters has a different passband, as is shown in FIG. 1. The passbands of the filters 11E-18E and 121E-128E are above and below, respectively, the frequency $f_c + f_o$ in FIG. 5. The combining circuits 30 and 33 each may be a unity gain operational amplifier having input signals resistively connected to a common input line thereof. The distribution circuit 40 also may be a unity gain operational amplifier having a plurality of output signals on lines 121F-128F, each of which contains the signal on line 39, which are resistively coupled from a common output line thereof to associated E receive circuit bandpass filters. The directional filters 34 and 37 in FIG. 1 desirably have cutoff frequencies such that the crossover frequencies thereof are both equal to the same frequency $f_o$ in FIG. 6. The lowpass filter 11J has an upper cutoff frequency that is less than $f_c$ and sufficiently low for passing only desired component signals in the output of modulator 11G and blocking harmonic signals having higher frequencies there on line 11H.

The east terminal also comprises a signal source 43 producing output signals on lines 44, 45 and 46, and a combining circuit 47. The signal on line 44 is a high frequency sinusoidal carrier signal having a frequency $f_c = 8$ MHz which is applied to circuit 47 and to the second modulator 11G. Alternatively, this may be an Hf square-wave carrier signal on line 44. The signal on line 45, however, is a pulse signal that is applied to only the combining circuit 47. The pulse signal has a low frequency pulse repetition rate $f_p = 8$ kHz that is at least twice the upper frequency limit $f_u = 0\ 4$ kHz of the voice channels. This means that selected sidebands containing associated input signals may be placed in adjacent 4 kHz segments of the frequency spectrum as is described more fully hereinafter. If $f_p$ is less than 8 kHz and $f_u = 4$ kHz, sidebands in adjacent carriers overlap causing distortion which cannot be filtered out by the bandpass filters. The same result occurs if $f_p = 8$ kHz and $f_u$ is greater than 4 kHz. If $f_p$ is greater than 8 kHz, then multiplexed sidebands will not be in adjacent 4 kHz segments of the frequency spectrum. The pulse signal is preferably nonsymmetrical, i.e., it has a pulse width $t$ which is less than the pulse repetition period T thereof, such that it is comprised of many components having frequencies which are both odd and even harmonics of $f_p$ and amplitudes that are approximately equal to that of the fundamental. The ratio $t/T$ determines the number of equal level harmonic component signals in the pulse and, thus, the number of channels that may be employed in a multiplex system embodying this invention as will be seen from the following description. It is only necessary that the amplitude of the pulse signal be large enough for components thereof to drive the C modulators. The signal on line 46 is a sinusoidal pilot signal having a frequency $12f_p = 96$ kHz, which is applied to the combiner 33. The pilot signal is employed in the west terminal for reproducing the pulse signal there, as is described more fully hereinafter.

The circuit 47 combines the carrier and pulse signals to produce a pulsed carrier signal on line 48 comprising sinusoidal components having frequencies $af_c \pm bf_p$ (see FIG. 4), which is applied to each of the C modulators. The combining circuit 47 may, by way of example, be a switched modulator in which the carrier and pulse signals are applied to the conventional voice and carrier input lines thereof. Alternatively, the circuit 47 may comprise an AND-gate 51 as is shown in FIG. 3. In a circuit 47 comprising such a switched modulator or AND-gate, the integer "$a$" is unity if the carrier signal on line 44 is a sinusoidal signal, and the integer "$a$" is odd if the carrier signal on line 44 is a square-wave signal.

The west terminal in FIG. 2 includes a combining circuit 130, a distribution circuit 140, second modulators 21G and 111G, directional filters 134 and 137, and combining circuit 147, which perform the same functions as similar elements designated by the two lower order digits in the east terminal. The directional filters 134 and 137 also have crossover frequencies which are equal to $f_o$ in FIG. 6. The lowpass filter 137 performs the dual function here of blocking receive signals on line 35 from the transmit circuits 21-28 and of passing only desired signals therefrom to the cable pair. The west terminal also comprises an oscillator 143 that produces a carrier signal of frequency $f_c = 8$ MHz on line 144, which is applied to the two G modulators here, and to the combining circuit 147; a second distribution circuit 136; and a pulse signal recovery circuit 100 which comprises a 96 L kHz pick-off filter 101, divider circuit 102, and pulse shaping circuit 104 which operate on the 96 kHz pilot signal from the east terminal to reproduce the 8 kHz pulse signal on line 105. The pulse and carrier signals on lines 105 and 144 are combined in circuit 147 to produce the pulsed carrier signal on line 148 which is applied to each of the C modulators. The signal sources 43 and 143 in the east and west terminals, respectively, may be synchronized in the conventional manner if this is desired.

Figure 4:
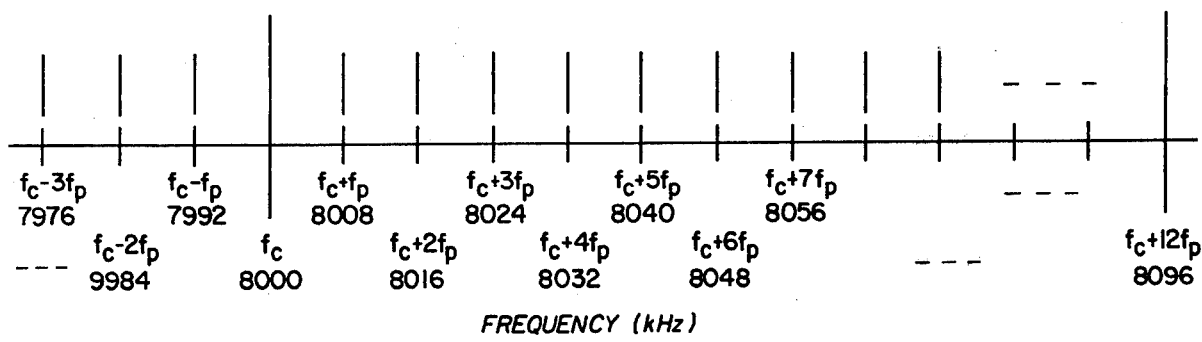
FIG. 4 is a representation of the frequencies of sinusoidal component signals comprising the pulsed carrier signal produced by circuit 47 on line 48.

The operation of this system in FIGS. 1 and 2 will now be described in relation to the representations in FIGS. 4–6. The lowpass filter 11A bandlimits the voice signal on line 1A. The pulsed carrier signal on line 48 (see FIG. 4) is modulated in circuit 11C by the bandlimited voice signal on line 11B. This causes the voice signal to appear on line 11D as sidebands of each of the carrier component frequencies $af_c \pm bf_p$ as is shown in FIG. 5. The output signal on each of the transmit circuit D lines is therefore as shown in FIG. 5 and of the form $af_c \pm bf_p \pm 4$ kHz: where $a$ and $b$ are integers designating particular harmonics of $f_c$ and $f_p$; $\pm 4$ kHz designates the upper and lower sidebands containing the voice signal of frequency $f_i$; and $i$ designates the associated channel. As was stated previously, the pulse signal is preferably nonsymmetrical so that the integer "$b$" is both odd and even. Also, the value of "$a$" is dependent on the type of C modulator that is employed and the structure of circuit 47. The integer "$a$" is at least equal to unity, however, and may also be other odd numbers. Thus, the signal format in FIG. 5 is representative of the signal on the D lines of circuits 11–18.

The bandpass filter 11E operates to select a particular sideband in FIG. 5 which contains only the voice signal in channel 1. More specifically, the filter 11E has a passband of 8052–8056 kHz for selecting and passing on line 11F only the lower sideband of the channel carrier frequency $f_c + 7f_p$ in FIG. 5. This sideband is designated by the triangle at the right there having the numeral 1 therein. This sideband is unique to the channel 1 in the east-west direction. Similarly, the filters 12E and 13E of other transmit circuits have different passbands for selecting the upper sideband of the channel carrier frequency $f_c + 7f_p$ and the lower sideband of the channel carrier frequency $f_c + 8f_p$, respectively. These sidebands are designated by the triangles at the right in FIG. 5 having the numerals 2 and 3 therein. These E filters select sidebands in adjacent frequency bands that are unique to these channels in the east-west direction. The bandpass filter 18E selects the upper sideband of the channel carrier frequency $f_c + 10f_p$ in FIG. 5. The filters 111E–118E, in associated west receive circuits of the other terminal, have the same passbands as do the filters 11E–18E, respectively, for reproducing the sidebands on the D lines there.

The circuit 30 sums the selected high frequency sideband signals on lines 11F–18F. The modulator 11G effectively combines each of the selected sidebands from filters 11E–18E (at the right in FIG. 5) with the carrier signal frequency $f_c$ to translate the former to unique positions in the low frequency spectrum which are indicated at the right in FIG. 6. More specifically, the output of modulator 11G is sidebands of frequencies which are equal to the sum and difference of the fundamental and harmonics of the carrier frequency $f_c$ and the carrier frequencies $f_c + 7f_p$; $f_c + 8f_p$; $f_c + 9f_p$; and $f_c + 10f_p$. Thus, the lowest resultant channel carrier frequencies on line 11H associated with filters 11E–18E, are the frequencies $7f_p$; $7f_p$; $8f_p$; $8f_p$; $9f_p$; $9f_p$; $10f_p$; and $10f_p$; respectively. The next highest channel carrier frequency on line 11H is the frequency $2f_c$. The lowpass filter 11J has an upper cutoff frequency such as $11f_p$, which is sufficiently high for passing the channel carrier frequencies $7f_p$ to $10f_p$ of the desired sidebands at the right in FIG. 6, and is sufficiently low for rejecting other frequencies of component signals on line 11H. The selected sidebands on line 11K (at the right of FIG. 6) are combined with the pilot signal of frequency $12f_p$ in circuit 33 and applied to line 35 for transmission to associated receive circuits in the west terminal.

The received signal on line 35 in FIG. 2 is blocked from the west transmit circuits 21–28 by the directional filter 137 and is passed by the directional filter 134 to distribution circuit 136. The receive signal containing the pilot and all of the selected sidebands 1–8 at the right in FIG. 6 is coupled to the pulse recovery circuit 100 and to modulator 111G. The 96 kHz pilot signal on line 99 is picked off by notch filter 101 and divided by 12 in circuit 102 to produce an 8 kHz pulse signal on line 103 which is shaped by circuit 104 to reproduce the pulse signal of frequency $f_p$ on line 105. The pulse signal and the carrier signal from source 143 are combined in circuit 147 to produce the pulsed carrier signal on line 148. Modulator 111G combines the carrier signal and the received signal to reproduce on line 139 the HF sidebands which appear at the right in FIG. 5. Distribution circuit 140 couples this signal on line 139 to each of the bandpass filters 111E–118E. The bandpass filter 111E selects the lower sideband of the channel carrier frequency $f_c + 7f_p$ which is combined in modulator 111C with the pulsed carrier signal to produce on line 111B components having frequencies which are equal to the sum and difference of $f_p$ and $f_c$ and the selected channel carrier frequency $f_c + 7f_p$. Stated differently, the signal on line 111B contains the voice signal in channel 1 and sidebands of various harmonics of $f_p$. Since the cutoff frequency of lowpass filter 111A is 3400 Hz, this filter passes only the reproduced voice signal on line 1H to hybrid 1D and the channel line 1B. In a similar manner, associated voice signals are reproduced in other voice channels.

The west transmit and east receive circuit operate in a similar manner for transmitting voice signals in the opposite direction, these circuits selecting at high frequencies particular sidebands designated by appropriate numerals in the triangles at the left in FIG. 5 and translating them to positions indicated at the left in FIG. 6 for transmission on line 35.

Alternate structure in FIG. 7 for producing the pulsed carrier signal, the sinusoidal carrier signal, and the pilot signal comprises a source 61 of pulses having a PRF $f_p = 8$ kHz, a source 63 of d-c supply voltage for powering an 8 MHz oscillator 65 producing sinusoidal carrier signals of frequency $f_c = 8$ MHz, and a pair of notch filters 67 and 69. Pulses on line 62 turn the voltage source 63 on and off at an 8 kHz rate to modulate the output of oscillator 65 to produce a pulsed carrier signal on line 48. As long as the oscillator 65 is not fully cut off by changes in the supply voltage, the signal on line 48 also contains the fundamental of frequency $f_c$ which is picked off by filter 67. The filter 69 picks off the 96 kHz pilot signal on line 62.

An alternate embodiment of this invention in which the C modulators are integrated circuit balanced modulators C', and which does not require either a combining circuit 47 or a pulsed carrier signal, is illustrated in FIG. 8. In the portion of a terminal represented in FIG. 8, a d-c supply voltage is connected through an electronic switch 71 to each of the C' integrated circuit modulators. The carrier signal $f_c$ and associated voice signal are applied to input lines of the C' modulators. The pulse signal on line 45 opens and closes switch 71 at the 8 kHz rate for providing the desired modulation of the input signals.

In the alternate embodiments which are generally illustrated in FIGS. 9 and 10, each channel transmit circuit includes an AND-gate circuit preceeding or following the associated C modulator for producing on the D lines the desired plurality of sideband signals in FIG. 5.

Although this invention is described in relation to preferred embodiments thereof, minor variations and modifications may occur to those skilled in the art. By way of example, the system may operate on input message signals other than voice signals and at voice frequencies. Also the passbands of the E filters may be arranged to select double sideband signals, rather than signal sideband signals as is shown in the system in FIGS. 1 and 2. Further, the A lowpass filters may be replaced by bandpass filters having a bandwidth W and upper frequency limit $f_u'$ for passing low frequency message signals, for example, that are spaced from d-c. If $W = 4$ kHz, for example, and $f_p \geq 2W = 8$ kHz, then the C modulators will interleave the sidebands of frequencies $af_c \pm bf_p$ to provide a pattern of sidebands on the $d$ lines that looks generally like that in FIG. 5. The E filters select desired sidebands at HF which may be operated on in a modulator 11G and filter 11J to translate them back into adjacent frequency bands at low frequencies in a pattern similar to that shown in FIG. 6. The filter passbands may also be arranged so that the carrier frequencies applied to the C and G modulators may be different values, or so that the carrier frequencies applied to the various C modulators of the same terminal and to transmit and receive circuits may be different values, for optimizing circuitry of the terminals or translating selected sidebands to other desired positions in the frequency spectrum. The scope of this invention is therefore to be determined from the attached claims rather than from the above-detailed description of preferred embodiments thereof.

What is claimed is:

1. In a frequency division multiplex system, apparatus for translating a message signal in one frequency band having a bandwidth W to an other frequency band for subsequent transmission, comprising:

first means for producing a pulse signal having a pulse repetition frequency $f_p$ and comprised of a plurality of sinusoidal harmonic component signals having frequencies $bf_p$; where $b$ is an integer; and for producing at least a first carrier signal having a frequency $f_{c1}$;

second means for combining the message signal, the pulse signal and the first carrier signal so as to cause the message signal to be in both lower and upper sidebands of the plurality of carrier frequencies $af_{c1} \pm bf_p$; where $a$ is also an integer; and third means for selecting at least one sideband of the lower and upper sidebands of a particular one of the frequencies $af_{c1} \pm bf_p$ containing the message signal.

2. Apparatus according to claim 1 wherein said first means produces pulses having a rate $f_p \geq 2W$ and produces a first carrier signal having a frequency $f_{c1} >> f_p$.

3. Apparatus according to claim 2 wherein said third means selects only a single one of the sidebands of the particular one frequency, and said first means produces a second carrier signal having a frequency $f_{c2}$ which may be different from $f_{c1}$, and including:
fourth means for combining the selected sideband signal with the second carrier signal for producing in the output thereof sidebands of component frequencies which are the sum and difference of $df_{c2}$ and the particular one of the frequencies $af_{c1} \pm bf_p$; where $d$ is an integer; and
fifth means receiving the output signal of said fourth means for selecting a single sideband of only a particular component frequency there.

4. Apparatus according to claim 3 wherein said fifth means selects a single sideband of a frequency which is a function of $bf_p$ and is independent of the carrier frequencies $f_{c1}$ and $f_{c2}$.

5. Apparatus according to claim 4 wherein said first means produces nonsymmetrical pulses at the rate $f_p$.

6. Apparatus according to claim 5 wherein said first means produces high frequency carrier signals and said third means comprises a polylithic crystal bandpass filter for selecting one sideband in the output of said second means at high frequencies.

7. In a frequency divison multiplex system, apparatus for translating a message signal in one frequency band having an upper frequency limit $f_u$ to an other higher frequency band for subsequent transmission, comprising:
first means for producing a pulse signal with pulses having a low-frequency pulse repetition frequency $f_p \geq 2f_u$ and comprised of a plurality of sinusoidal harmonic component signals having frequencies $bf_p$, where $b$ is an integer; and for producing at least a first carrier signal at high frequencies having a frequency $f_{c1} >> f_p$;
second means for combining the message signal, the pulse signal and the first carrier signal so as to cause the message signal to be in both lower and upper sidebands of the plurality of carrier frequencies $af_{c1} \pm bf_p$, where $a$ is also an integer; and
third means for selecting at least one sideband of the lower and upper sidebands of a particular one of the frequencies $af_{c1} \pm bf_p$ containing the message signal.

8. Apparatus according to claim 7 wherein the message signal is a voice signal, said third means selects only a single one of the sidebands of the particular one frequency, and said first means produces a second high frequency carrier signal having a frequency $f_{c2}$ which may be different from $f_{c1}$, and including fourth means for combining the selected one sideband signal with the second high frequency carrier signal for producing in the output thereof sidebands of component frequencies which are the sum and difference of $df_{c2}$ and the particular one of the frequencies $af_{c1} \pm bf_p$, where $d$ is an integer; and fifth means receiving the output signal of said fourth means for selecting a single sideband of only a particular component frequency there.

9. Apparatus according to claim 8 wherein said fifth means selects a single sideband of a low frequency which is a function of $bf_p$ and is independent of the high frequencies $f_{c1}$ and $f_{c2}$.

10. Apparatus according to claim 9 wherein said first means produces nonsymmetrical pulses at the rate $f_p$.

11. Apparatus according to claim 10 wherein said third means comprises a polylithic crystal bandpass filter for selecting one sideband in the output of said second means at high frequencies.

12. Apparatus according to claim 11 wherein said fifth means comprises a lowpass filter for passing only a sideband of a component signal having a low frequency $bf_p$ which is independent of the high frequencies $f_{c1}$ and $f_{c2}$.

13. Apparatus according to claim 12 including a lowpass filter on the input of said second means for passing voice frequencies in the message signal.

14. Apparatus according to claim 2 wherein said second means comprises AND-gate means responsive to the pulse signal and the first carrier signal for producing a pulsed carrier signal comprising a plurality of component signals having frequencies $af_{c1} \pm bf_p$, and a modulator receiving the message signal and the output signal of said AND-gate means.

15. Apparatus according to claim 2 wherein said second means comprises AND-gate means responsive to the message signal and the pulse signal for producing a sampled message signal, and a modulator receiving the sampled voice signal and the first carrier signal.

16. Apparatus according to claim 2 wherein said second means comprises a modulator for modulating the carrier signal with the one message signal, and AND-gate means for logically combining the modulated signal and the pulse signal.

17. Apparatus according to claim 2 wherein said second means comprises active modulator means having a pair of inputs receiving the message signal and the first carrier signal, and including fourth means responsive to the pulse signal for applying a d-c voltage to said modulator means at the rate $f_p$.

18. Apparatus according to claim 2 wherein said first means comprises a source of first carrier signal and fourth means responsive to the pulse signal for energizing said source at the rate $f_p$ for producing a pulsed carrier signal having component frequencies $af_{c1} \pm bf_p$; said second means comprising a modulator modulating the pulsed carrier signal with the one message signal.

19. In a frequency division multiplex system, the method of translating a message signal in one frequency band having an upper frequency limit $f_u$ to an other frequency band for subsequent transmission comprising the steps of:
first combining the message signal, a pulse signal having a pulse repetition frequency $f_p$ and comprised of a plurality of sinusoidal harmonic components having frequencies $bf_p$, and a first carrier signal having a frequency $f_{c1}$ so as to cause the message signal to be in both the lower and upper sidebands of each of the plurality of frequencies $af_{c1} \pm bf_p$; where $a$ and $b$ are integers; and
first selecting at least one of the sidebands of only a particular one of the frequencies $af_{c1} \pm bf_p$ containing the message signal.

20. The method according to claim 19 wherein the pulses have a low frequency rate $f_p \geq 2f_u$ and the first carrier signal has a high frequency $f_{c1} >> f_p$.

21. The method according to claim 20 wherein only one sideband of the particular one frequency is selected in the first selecting step and including the additional steps of:
second combining the selected sideband signal with a second high frequency carrier signal of frequency $f_{c2}$ (which may be different from $f_{c1}$) for producing sidebands of frequencies which are the sum and difference of $df_{c2}$ and the particular one of the frequencies $af_{c1} \pm bf_p$; where $d$ is an integer; and second selecting from the signal components produced in said second combining step only a single sideband of a low frequency which is a function of $bf_p$ and is independent of $f_{c1}$ and $f_{c2}$.

22. The method of translating a message signal in one frequency band having a bandwidth W to an other frequency band for subsequent transmission, comprising the steps of:

first combining the message signal, a first carrier signal having a frequency $f_{c1}$, and a pulse signal having a pulse repetition rate $f_p \geq 2W$, the pulse signal being comprised of a plurality of sinusoidal harmonic components having frequencies $bf_p$, so as to cause the message signal to be in each of the sidebands of the plurality of frequencies $af_{c1} \pm bf_p$; where $a$ and $b$ are integers; and first selecting from the sidebands at least one of the sidebands of only a particular one of the frequencies $af_{c1} \pm bf_p$.

23. The method according to claim 22 wherein only one sideband of the particular one frequency is selected in said first selecting step and including the additional steps of:

second combining the selected sideband signal with a second carrier signal of frequency $f_{c2}$ (which may be different from $f_{c1}$) for producing sidebands at frequencies which are the sum and difference of $df_{c2}$ and the particular one of the frequencies $af_{c1} \pm bf_p$; where $d$ is an integer; and second selecting from the signal components produced in the second combining step only a single sideband of a frequency which is a function of $bf_p$ and is independent of the $f_{c1}$ and $f_{c2}$.